United States Patent [19]

Stead

[11] 3,734,558
[45] May 22, 1973

[54] DUAL PURPOSE RECREATIONAL VEHICLE

[76] Inventor: Ronald B. Stead, 8351 Imperial Highway, Downey, Calif. 90242

[22] Filed: June 21, 1971

[21] Appl. No.: 154,831

[52] U.S. Cl. .................................. 296/23 R, 296/1 A
[51] Int. Cl. .............................................. B60p 3/32
[58] Field of Search ................... 296/1 A, 23 R, 24, 296/23 B, 23 D, 23 E, 23 F

[56] References Cited

UNITED STATES PATENTS 3,116,949   1/1964   Muse .................................. 296/23 B

*Primary Examiner*—Philip Goodman
*Attorney*—Donald R. Nyhagen

[57] ABSTRACT

A dual purpose recreational vehicle having a coach for use as a living quarters and a carrier for motor driven cycles and the like. The coach has an interior floor with an access opening to a cycle storage well below the floor, and removable panel means, such as hinged floor panels, which normally close the access opening to provide a floor surface across the storage well and may be raised to permit placement of one or more cycles in upright travel positions in the well. The well contains channels for receiving the cycle wheels and supporting the floor panels when in closed position within the access opening. The coach has a rear door opening and a removable step usable as a ramp for moving cycles into and from the coach through the door opening.

11 Claims, 4 Drawing Figures

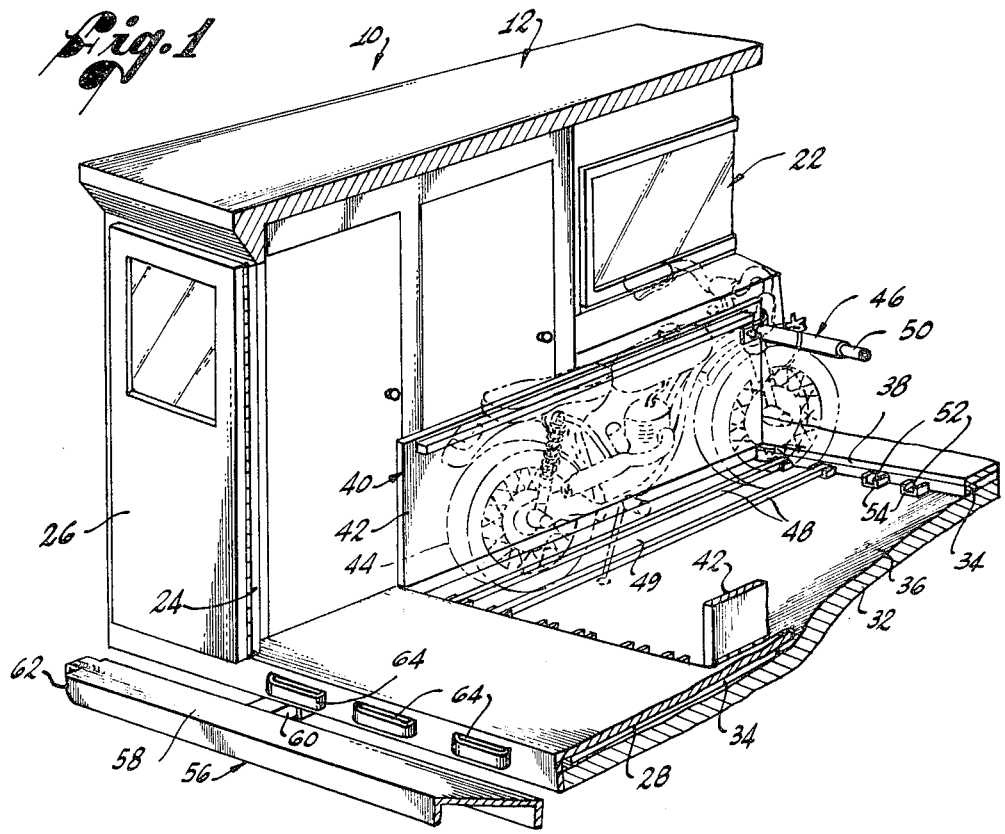
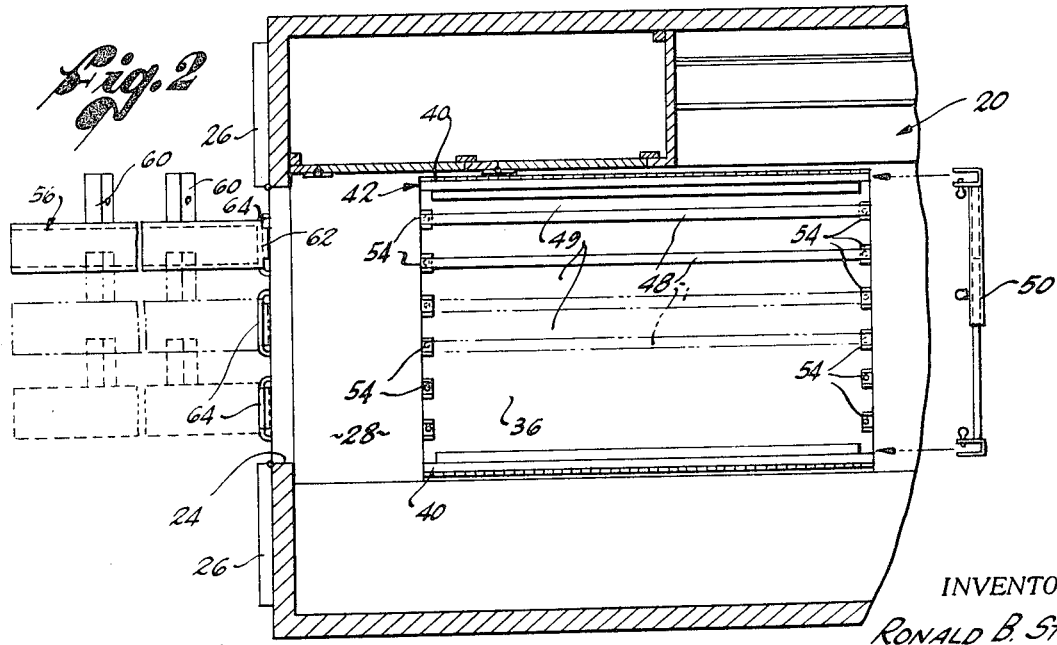

INVENTOR.
RONALD B. STEAD

DUAL PURPOSE RECREATIONAL VEHICLE

BACKGROUND OF THE INVENTION

1. Field of the Invention

This invention relates generally to recreational vehicles and more particularly to a novel dual purpose recreational vehicle adapted for use as both a living quarters and a carrier for motor driven cycles and the like.

2. Discussion of the Prior Art

Trips with travel trailers, campers, and vans equipped with living quarters have long been a very popular form of recreation. A more recent form of recreation which is gaining in popularity is riding motor driven cycles. An ever increasing number of persons are combining these two forms of recreations by taking motor driven cycles on their camper and trailer trips for use at their various stops and campsites.

This combined form of recreation presents one problem with which the present invention is concerned. The problem referred to involves transportation of the motor driven cycles on the recreational vehicles. Thus, at the present time, many recreational vehicles, particularly campers and trailers, are equipped with a rear step or the like having means for anchoring a cycle in travel position on the step. This arrangement has several disadvantages. For example, the cycle is exposed to the elements, road dust, flying stones and the like in transit. Moreover, if the vehicle is left unattended, the cycle is prone to theft or vandalism. In most cases, only a single cycle may be carried which is a distinct disadvantage when there is more than one cycle rider, as is the usual situation.

A variety of cargo vehicles have been devised, of course, for transporting other vehicles. Examples of such cargo vehicles are shown in the following U.S. Pat. Nos. 1,282,764; 1,750,128; 2,022,376; 2,432,228; 2,492,980; 2,595,533; 3,099,230; 3,193,821; 3,219,152 and 3,448,875.

SUMMARY OF THE INVENTION

The present invention provides a novel dual purpose recreational vehicle which avoids the above problems by providing for the storage of several motor driven cycles within the vehicle. To this end, the recreational vehicle has a coach containing living quarters complete with furniture and the other living facilities commonly found in such vehicles. The furniture is arranged to provide a central clear floor area. Beneath the interior coach floor is a sub-floor and braces providing a cycle storage well below the central floor area. This floor area contains an access opening to the storage well which is normally closed by removable interior floor panel means, such as hinged floor panels. When closed, these floor panels provide a floor surface across the well, flush with the surface of the surrounding interior floor.

Within the storage well are means for locating one or more cycles in upright travel positions in the well. In the particular inventive embodiment illustrated, for example, the well contains a number of channels arranged side by side for receiving the wheels of a number of cycles and means for anchoring the cycles in upright positions. These channels are laterally adjustable to change their location laterally of the vehicle and to vary the spacing between channels. The channels support the floor panels when in closed position. When in open position, the floor panels stand generally upright against the furniture at the sides of the well to shield the furniture against being soiled and damaged by the cycles, particularly when placing the cycles in and removing them from the well.

The cycles are moved into and from the coach through a door opening in the rear end of the coach. Preferably, this door opening extends virtually the full width of the coach and is closed by double doors to facilitate passage of cycles through the opening. According to a feature of the invention, the vehicle is equipped with a rear step which may be removed and placed in an inclined position to serve as a ramp for wheeling cycles into and from the coach.

The invention is disclosed in connection with a travel trailer. However, it will be readily evident from the ensuing description that the invention may be embodied in other types of recreational vehicles.

BRIEF DESCRIPTION OF THE DRAWINGS

FIG. 1 is a fragmentary perspective view of a dual purpose recreational vehicle according to the invention;

FIG. 2 is a horizontal section through the vehicle;

DESCRIPTION OF THE PREFERRED EMBODIMENT

Figure 3:
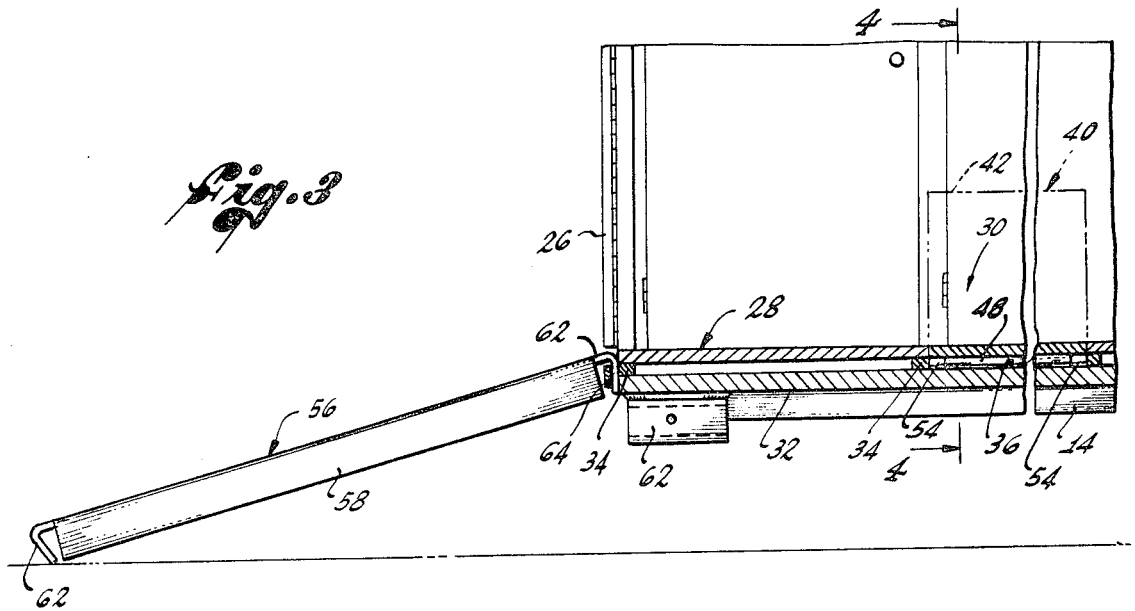
FIG. 3 is a fragmentary vertical section through the vehicle.
Figure 4:
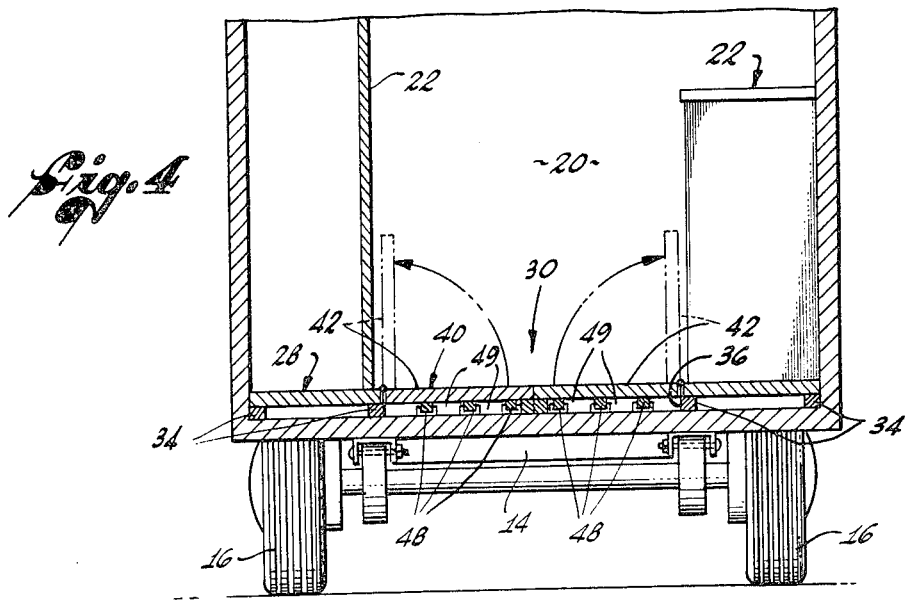
FIG. 4 is a section taken on line 4-4 in FIG. 3.

The dual purpose recreational vehicle 10 of the invention selected for illustration in the drawings is a travel trailer. Except for the present improvements which adapt the trailer to serve as a carrier for motor driven cycles and the like, the trailer is essentially conventional and hence need not be described in elaborate detail. Suffice it to say that the trailer has a coach 12 mounted on a frame 14 with ground wheels 16 and a front hitch tongue for connection to a towing vehicle. The coach provides interior living quarters 20 including furniture 22 and the other living facilities commonly found in such trailers. Access to and egress from the living quarters is through a door opening 24 at the rear of the coach. According to a feature of the invention and for reasons which will appear presently, the door opening 24 extends substantially the full width of the coach and is closed by double doors 26. These doors are hinged along their outer edges to the door frame, such that the doors may be opened in the manner shown to permit use of the entire door opening.

Coach 12 has an interior floor 28. Furniture 22 is arranged in such a way as to provide the floor with a clear central floor area 30. Below the interior floor 28 is a sub-floor 32 on which the interior floor is supported by joists 34. Sub-floor 32 and joists 34 form a cycle storage well 36 below the central floor area 30 and bounded along its sides by joists. This central floor area has an access opening 38 to the storage well closed by removable closure means 40 which form part of the interior floor 28. The particular removable closure means illustrated comprise a pair of floor panels 42 which are hinged along their outer longitudinal edges to the longitudinal edges of the access opening 38 for swinging of the panels between their illustrated open and closed positions. When in open position, the floor panels 42 are disposed in generally upright positions against the furniture 22 at opposite sides of the access opening 38.

Storage well 36 is adapted to receive a number of motor driven cycles 44 (only one shown) side by side in the positions shown. Means 46 are provided for locating or retaining the cycles in their upright storage positions. The illustrated cycle retaining means comprise bars 48 in the well forming channels 49 for receiving the cycle wheels and an adjustable cross bar 50 which is attached to the open floor panels 42 and to which the cycles are tied. The bars 48 may be permanently fixed in position in the well. According to a preferred feature of the invention, however, the bars are laterally adjustable to accommodate cycles of various sizes. To this end, the ends of the bars fit removably within slots 52 in blocks 54 along the front and rear edges of the well 36. A unique feature of the invention resides in the fact that the floor panels 42, when in their upright open positions, protect the furniture along the sides of the storage well against being soiled or damaged by the cycles. The coach floor 28 including the floor panels may be carpeted to prevent the panels from marring the furniture when open. The panels may have finger holes or other means to permit them to be easily opened.

As noted earlier, the coach 12 has a larger rear door opening 24 and double doors 26. This large door opening is provided to facilitate passage of the cycles 44 into and from the coach. In most cases, a ramp must be provided to permit wheeling of cycles from ground level up to the coach floor 28 and from the floor down to ground level. Any suitable ramp may be used for this purpose. According to a further feature of the invention, however, the vehicle 10 is equipped with a rear combination bumper and step 56 which may be removed and used as a ramp. To this end, the step comprises a channel 58 or the like with arms 60 which fit removably within sockets 62 attached to the rear of the vehicle frame 14. The arms may be releasably secured in the sockets in any convenient way, as by removable cross pins. Channel 56 has flanges 62 at its ends which may be engaged in brackets 64 on the rear of the coach to retain the channel in position when used as a ramp. These brackets may be placed as shown to permit lateral adjustment of the ramp for convenience of movement of cycles into and from the storage well channels 49.

It will now be understood that when the floor panels 42 are closed to cover the cycle storage well 36, the recreational vehicle 10 may be used as living quarters in the same manner as any conventional trailer. When traveling from place to place, the vehicle may be used as a cycle carrier by anchoring cycles 44 in the well in the manner described. If desired, the rear step-ramp 56 may be equipped with means for holding an additional cycle.

What is claimed as new in support of Letters Patent is:

1. A dual purpose recreational vehicle for use as a living quarters and a carrier for motor driven cycles and the like, comprising:
   a coach having an interior floor with an exposed area and adapted to be used as a living quarters,
   means including a sub-floor below said interior floor forming a cycle storage well below said floor area, said subfloor closing the bottom of said well to seal the latter against entrance of dust and dirt into the well and coach interior,
   said interior floor having an access opening to said well within said central floor area and removable panel means for closing said access opening,
   said floor panel means being adapted to be placed within said access opening to close the latter and provide an interior floor surface over said well, and said floor panel means being removable from said access opening to provide access to said well for placement of a cycle in travel position in the well, and
   said coach having a rear door opening through which cycles may be moved into and from the interior of the coach.

2. A recreational vehicle according to claim 1 including:
   means for supporting a cycle in an upright travel position in said well.

3. A recreational vehicle according to claim 2 wherein:
   said cycle supporting means comprises channel forming means in said well providing at least one channel for receiving cycle wheels.

4. A recreational vehicle according to claim 3 wherein:
   said channel forming means supports said floor panel means in said well access opening with the upper surface of the panel means flush with the upper surface of the surrounding interior floor.

5. A recreational vehicle according to claim 1 wherein:
   said coach contains furniture at opposite sides of said well; and
   said floor panel means comprise a pair of panels hinged along their outer longitudinal edges to the longitudinal edges of said well access opening for swinging between closed positions in said access opening and open upright positions against the furniture at opposite sides of the well to shield the latter furniture against being soiled or damaged by the cycle.

6. A recreational vehicle according to claim 1 including:
   means for supporting a number of cycles side by side in upright travel positions in said well.

7. A recreational vehicle according to claim 6 wherein:
   said cycle supporting means comprise channel forming means in said well providing a number of channels disposed side by side in said well for receiving the cycle wheels.

8. A recreational vehicle according to claim 7 wherein:
   said channel forming means support said floor panel means in said well access opening with the upper surface of said panel means flush with the upper surface of the surrounding interior floor.

9. A recreational vehicle according to claim 8 including:
   means for laterally adjusting said channels relative to one another in said well, and retaining said channels in adjusted positions.

10. A recreational vehicle according to claim 9 wherein:
    said floor panel means comprise a pair of panels hinged along their outer longitudinal edges to the longitudinal edges of said well access opening for swinging between closed positions in said access opening and open upright positions against the furniture at opposite sides of the access opening to shield the latter furniture against being soiled or damaged by the cycles.

11. A recreational vehicle according to claim 1 including:

a member removably attached to the rear of said vehicle for use as a step and a ramp for moving cycles into and from said coach.

* * * * *